(12) United States Patent
Schmandt et al.

(10) Patent No.: US 7,738,637 B2
(45) Date of Patent: Jun. 15, 2010

(54) INTERACTIVE VOICE MESSAGE RETRIEVAL

(75) Inventors: Christopher Schmandt, Winchester, MA (US); Natalia Marmasse, Cambridge, MA (US); Vidya Lakshmipathy, San Mateo, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 233 days.

(21) Appl. No.: 10/897,709

(22) Filed: Jul. 24, 2004

(65) Prior Publication Data

US 2006/0018446 A1   Jan. 26, 2006

(51) Int. Cl.
*H04M 1/64* (2006.01)
(52) U.S. Cl. ............... 379/88.17; 379/88.18; 379/88.22; 379/202.01; 704/270.1
(58) Field of Classification Search .................... 379/76, 379/88.18, 88.23, 29.02, 88.1, 88.26, 88.17, 379/88.22, 202.01; 455/412.1; 704/249, 704/251, 270, 270.1; 709/233
See application file for complete search history.

(56) References Cited

U.S. PATENT DOCUMENTS

| | | | | |
|---|---|---|---|---|
| 4,761,807 A | * | 8/1988 | Matthews et al. | 379/88.26 |
| 4,841,560 A | * | 6/1989 | Chan et al. | 379/29.02 |
| 5,568,539 A | * | 10/1996 | Bergsman et al. | 379/88.22 |
| 5,899,972 A | * | 5/1999 | Miyazawa et al. | 704/249 |
| 6,366,960 B1 | * | 4/2002 | Hawkes | 709/233 |
| 6,459,774 B1 | * | 10/2002 | Ball et al. | 379/67.1 |
| 6,807,254 B1 | * | 10/2004 | Guedalia et al. | 379/88.1 |
| 6,885,733 B2 | * | 4/2005 | Pearson et al. | 379/76 |
| 7,107,217 B2 | * | 9/2006 | Watanabe et al. | 704/270 |
| 7,346,509 B2 | * | 3/2008 | Gallino | 704/251 |
| 7,412,048 B2 | * | 8/2008 | Gao et al. | 379/202.01 |
| 2003/0216923 A1 | * | 11/2003 | Gilmore et al. | 704/270.1 |
| 2005/0114132 A1 | * | 5/2005 | Hsu | 704/251 |

* cited by examiner

*Primary Examiner*—Gerald Gauthier
(74) *Attorney, Agent, or Firm*—Charles G. Call (57) ABSTRACT

A method for exchanging voice messages that may be employed in an answering machine, in wired or wireless telephone, or in an voice messaging system. An incoming voice message from a message source is received and recorded, parsed into segments, and the parsed message is played back to a listener, pausing between each of the parsed segments to accept and record a spoken response from the listener. A reply message is returned to the original message source that includes each such spoken response along with a snippet extracted from the particular segment responded to in the original message. The listener may also interrupt the playback of the voice message at any time to record a response.

20 Claims, 7 Drawing Sheets

INTERACTIVE VOICE MESSAGE RETRIEVAL

FIELD OF THE INVENTION

This invention relates to voice messaging systems.

BACKGROUND OF THE INVENTION

The most common and expressive setting for the use of language is face-to-face conversation. It is something that most everyone in the world has some experience doing and requires little training. Conversation is both an individual and social process. It is a joint action that requires common ground for the coordination of meaning and understanding.

Many ways have been developed to establish common ground in face-to-face conversation. Because the exchange is in real time, people engaged in a face-to-face conversation can show understanding with back-channel feedback; by pointing, gesturing or gazing, and by their choice of words, timing, and turn-taking. Importantly, those engaged in a conversation can also interrupt if they wish to speak before it is their turn.

Over the last 50 to 75 years, technology has removed the need to be face-to-face to communicate in real time. As the telephone has made its way into every house, and now into nearly every pocket, we've learned to converse without co-presence. We've established techniques to continue joint actions and establish common ground without facial expression or gesture and only with language. Because the conversation still occurs in real time, we can use back-channel feedback and turn-taking metaphors to establish common ground and have successful communication.

The answering machine has added a new dimension to distance communication. Asynchronous communication moved us farther from the familiar face-to-face style, requiring new skills. With voicemail, there is no way to continually ground events over the course of the conversation; the lack of feedback interferes with the normally mutual process of grounding events. In addition to the extra burden required to keep common ground in short term memory, one has to continually remember to check for messages, and often there is an added task of having to respond by calling each person back. While these are all clearly skills we can learn, there might be a cost in the quality or pleasure of communication.

A number of factors confound study of the use of stored voice as a communication medium. First, it spans two very different sorts of technologies, answering machines (stand alone recording devices, found in domestic settings) and voicemail systems, accessed by telephone only and typically (though not exclusively) in business settings. Each of these environments produces a different mix of voice message genres (e.g. chatty, information gathering, informing, decision making) though there may be some overlap; message type likely influences user interface requirements. With an answering machine, messages are typically heard and then discarded. In a voice messaging system, the messages may be annotated, forwarded, and archived.

Studies focused on expert users of voicemail have found that there are three main problems experienced when managing voicemail: scanning, information extraction and search (see "All talk and all action: strategies for managing voicemail messages," by S. Whittaker, J. Hirschberg and C. H. Nakatani in *Proceedings of Human Factors in Computing Systems (CHI)*, 1998, pp. 249-250. Scanning is used to give message priority and for locating saved messages. Information extraction is often done by taking notes about a message in order to save important information for future reference. Users also spend a large amount of time searching for archived messages and tracking the status of saved messages.

The problem of information extraction in the context of formulating a reply to a voicemail has been addressed with interfaces that allow users to take notes related to the content of the voicemail or allow them to scan a transcript of the message as they listen. See "Jotmail: a voicemail interface that enables you to see what was said," by S. Whittaker, R. Davis, J. Hirschberg and U. Muller in *Proceedings of Human Factors in Computing Systems (CHI)*, 2000, pp. 89-96, and "SCANMail: a voicemail interface that makes speech browsable, readable and searchable," by S. Whittaker, J. Hirschberg, B. Amento, L. Stark, M. Bacchiani, P. Isenhour, L. Stead, G. Zamchick, and A. Rosenberg in *Proceedings of Human Factors in Computing Systems (CHI)*, 2002, pp. 275-282.

Answering machines (or phone-accessed voicemail systems) do not have rich graphical user interfaces, and users are required to either jot down notes or keep the content of the message in memory as they attempt to respond. Voicemail has more recently become a very popular feature for mobile phones. Checking voicemail while mobile and with such a small screen makes it nearly impossible to take notes or view transcripts. As a result, more practical methods of replying to voicemail need to be explored. As is well known, memory or recall from memory deteriorates with age, making this task of extracting and remembering information difficult for the elderly. Message recipients must also juggle functionality between listening to a series of messages and then dialing phone numbers, while keeping the message in memory, to reply.

Additionally, despite the media richness of computer-mediated communication, voicemail still remains a closed, single-medium system. Although prevalent on mobile devices and in networked environments, it has rarely benefited from the devices and connectivity around it. It is accordingly desirable to utilize existing capabilities to perform functions such as accepting and delivering voice messages via the Internet, and to support sender-supplied photos and voice annotated slide shows as messages.

Previous attempts to provide a "conversational answering machine" include the PhoneSlave, developed nearly two decades ago. See "Phone Slave: A graphical telecommunications interface," by C. Schmandt and B. Arons in *Proceedings of the Society for Information Display*, 26(1), 1985, pp. 79-82. PhoneSlave used recorded speech and pause-based audio recording to gather responses to questions such as "Who's calling please?", "What's this in reference to?", and "At what number can you be reached?," and later could play each of these snippets back to the PhoneSlave owner, in response to voice commands. PhoneSlave used speech recognition (in lieu of today's telephone caller ID) to try to identify repeat callers, and could deliver personal messages to them when they called back, as well as indicate whether their previous message had been heard.

Part of PhoneSlave's attraction at the time was that voicemail was still new enough that callers were often not facile at leaving messages on a machine; PhoneSlave took complete messages by turning the interaction into a form-filling conversation. Most callers would likely be unwilling to participate in such a routine now, although "Whom may I say is calling?" has been used for call screening in products by Active Voice and Wildfire (available on the World Wide Web at www.activevoice.com and www.wildfire.com).

A Japanese project implemented answering machines which would mutter back-channel responses ("hai" in Japanese) to encourage callers to leave longer or more complete messages is described in "A Multi-functional Telephone with Conversational Responses and Pause Deletion Recording," by K. Gomi, Y. Nishino, H. Matsui, and F. Nakamura, *IEEE Transactions on Consumer Electronics,* 1988. The "Grunt" system described by C. Schmandt in "Employing Voice Back Channels to Facilitate Audio Document Retrieval," *Proceedings of ACM Conference on Office Information Systems (COIS),* 1988, pp. 213-218, presented driving directions over a telephone, pausing between each major route segment and analyzing any user response based on length and pitch contour to decide whether and when to proceed, or offer more explanation.

In the 1990's several research systems used conversational paradigms bordering on natural language input to control live interactive systems over the phone using speech recognition. MailCall described by M. Marx and C. Schmandt in "MailCall: Message Presentation and Navigation in a Nonvisual Environment," *Proceedings of Human Factors in Computing Systems (CHI),* 1996, pp. 165-172, emphasized text message retrieval, and its successor SpeechActs described by N. Yankelovich, N., G. Levow and M. Marx in "Designing SpeechActs: issues in speech user interfaces," *Proceedings of Human Factors in Computing Systems (CHI),* 1995, pp. 369-376, used more conversational techniques and covered a wider range of applications. QuietCalls described by L. Nelson, S. Bly and T. Sokoler in "Quiet Calls: Talking Silently on Mobile Phones," *Proceedings of Human Factors in Computing Systems (CHI),* 2001, pp. 174-181, supported live voice interaction over telephones, with one party speaking and the other playing recorded audio snippets, driven by a conversational state model.

U.S. Pat. No. 5,880,840 issued to Lang et al. (Sony Corp.) on Mar. 30, 1999 describes a voice mail reply method for use in answering machines and office voice mail systems in which an incoming voice mail message is stored and then played back. As the voice mail message is being played back, the listener can interrupt the playback and record a response. The original voice mail message, with the responses inserted, is then returned to the originator.

SUMMARY OF THE INVENTION

The present invention simulates a synchronous conversation in an asynchronous medium. It is an answering machine or voice mail system that breaks incoming voice messages into chunks, and while playing these sequentially, pauses between each to record a response. The recipient can also interrupt and inject a response at any point during playback. The system leverages principles of immediacy and co-presence from conversation to make the interaction simpler and more pleasant and informative for both the message leaver and the message recipient.

The preferred embodiment of the invention takes the form of a method for exchanging voice messages and may be employed in an answering machine, in wired or wireless telephone, or in an voice messaging system. The method comprises the steps of receiving and recording an incoming voice message from a message source, parsing the recorded voice message into segments, reproducing the voice message to a listener while pausing between each of the parsed segments to accept and record a spoken response from the listener, and transmitting a reply message including each such spoken response to the message source. The listener may also interrupt the playback of the voice message at any time to record a response.

The step of parsing the voice message into segments preferably comprises detecting segment-delimiting pauses in the content of said voice message. The detected pauses may be intervals of "silence" in the voice message having a low average magnitude, and/or may be marked by an abrupt significant decrease in average voice signal magnitude (indicating the start of a pause) followed by an abrupt increase in average magnitude (indicating a resumption in speech). Segments may also be delimited by detecting single syllables of extended duration which indicate "filled pauses" (e.g. "aaah" or "err"), or by detecting the ends of questions which are indicated by a rise in pitch of the caller's voice message.

The reply message that is returned to the originator of the original voice message preferably comprises the combination of each spoken response and at least a portion of that segment of the original voice message that was reproduced immediately before the recording of each such spoken response. The portion of the original message that is extracted (called a "snippet") and returned to the originator preferably has a predetermined maximum duration and may be time compressed to reduce its duration while preserving its information content. Pauses may be affirmatively inserted after each recorded response and each inserted snippet may be used to delimit the reply message so that it may in turn be parsed into segments and replied to.

The reply message may be returned to the originator of the original voice message by establishing a telephone connection to the originator and transmitting the reply message via this telephone connection. Alternatively, the reply message may be sent as an audio file via the Internet to the originator, or included as an audio file attachment to an email sent to the originator. The reply message may also be stored as a file or collection of files on the originator's voice mail system, if the originator and the recipient are using compatible, linked voice mail systems.

These and other features and advantages of the present invention may be better understood by considering the following detailed description of an illustrative embodiment of the invention.

BRIEF DESCRIPTION OF THE DRAWINGS

In the detailed description which follows, frequent reference will be made to the attached drawings, in which:

FIG. 8 is a diagram illustrating the manner in which the responses recorded by a listener are correlated to the segments responded to.

DETAILED DESCRIPTION

Overview

The present invention is conversational telephone messaging system that may be implemented in a standalone answering machine, in a voice messaging server, voice mail system, PBX or central office, or in a cellular, portable or wired telephone.

The invention allows a calling party to record a voice message when the called party is unavailable, and allows the called party to more effectively listen to and respond to the recorded message. The system parses the recorded message into segments by detecting pauses between segments in the recorded message. Thereafter, the recorded message is played and stopping briefly between each segment to provide the listener with the opportunity to record a response. The system detects the silence between pauses, waits for a recorded response, and then resumes playback at the next segment if no response is recorded. After each response is recorded, the playback resumes with the next segment. The listener can also interrupt the playback at any time to interject a response. The recorded responses are then combined with brief excerpts from each of the segments responded to, forming a reply message that may be sent in various ways to the original caller.

The invention makes replying to messages more conversational. Parsing the incoming message into segments, and pausing (with an optional beep) after each segment invites a response. The listener may also interrupt the playback and interject a response within a segment whenever the automatic segmentation is insufficient.

Figure 1:
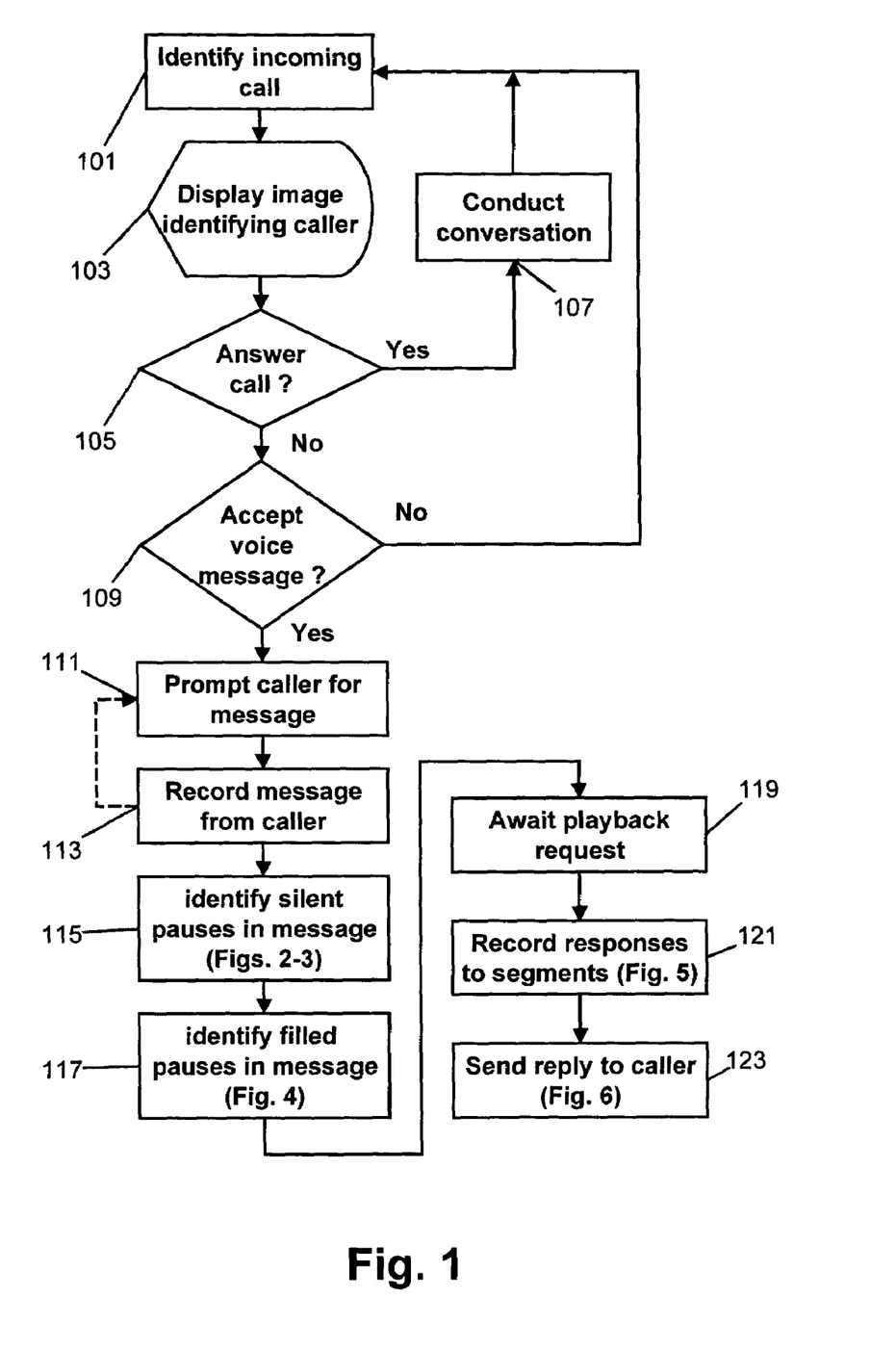
FIG. 1 is a flow chart illustrating the overall operation of the preferred embodiment.

FIG. 1 depicts the overall operation of the system. When an incoming call is detected at 101, the identity of the caller determined from caller ID information is displayed as seen at 103. The display may take the form of a display on the handset or some other display device, and may consist of the calling telephone number, text information about the caller, and/or a photograph or other image depicting the caller extracted from an available database indexed by the calling telephone number.

If the called party is available, he or she may elect to answer the call at 105 and engage in an immediate conversation as indicated at 107. Otherwise, the telephone number of caller may be tested against a call screening database as seen at 109 to determine whether or not to invite the recording of a voice mail message. For example, the user may store telephone numbers from which messages should not be recorded in the same database used to store auxiliary caller ID information and/or images.

If a voice mail message is to be accepted from the calling party, the system then plays a recorded prompt message at 111 (e.g., "I'm sorry, but I'm not available to take your call right now. Please leave a message at the sound of the tone"). The incoming voice mail message is then recorded as shown at 113.

Figure 8:
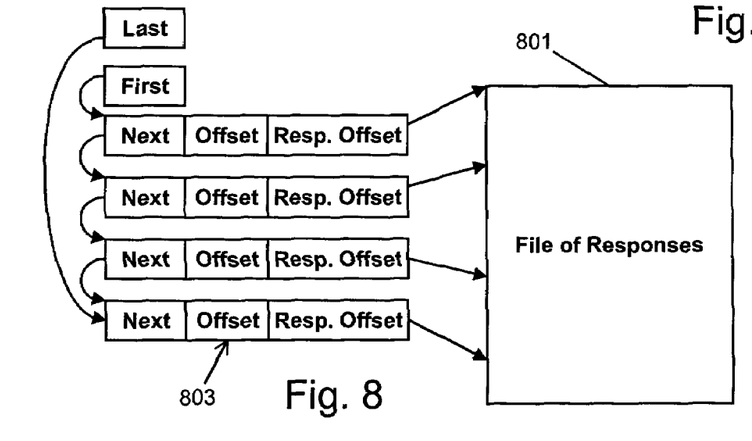
Figure 9:
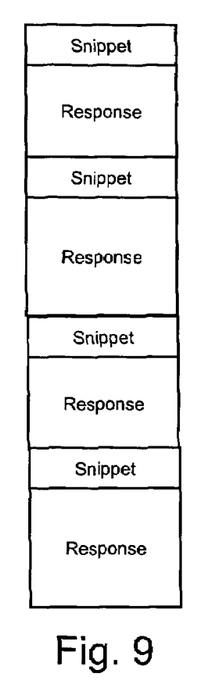
FIG. 9 is a diagram illustrating the layout of a reply message consisting of segments of the message being responded to and the individual recorded responses to those segments.

After (or during) the recording of the incoming voice mail message at 113, the system subdivides the recorded message into segments delimited by "silent pauses" (indicated by brief periods of minimal voice signal amplitude), or by "filled pauses" (indicated by the presence of long single syllables). The location of segment delimiting silent pauses is detected as indicated at 115 in FIG. 1 and described in more detail below in connection with FIGS. 2 and 3 of the drawings. The location of filled pauses is detected as seen at 117 in FIG. 1 and described in more detail below in connection with FIG. 4. At those positions in the received voice mail message where a silent or filled pause is detected, the system automatically interrupts the playback, waits for a recorded response from the listener, and resumes the playback with the next segment after the recording or if no response is provided. Finally, as indicated at 123 in FIG. 1 and shown in more detail in FIG. 5, the voice message is played back to a listener who records responses. Finally, as described in more detail in connection with FIG. 6, a reply message consisting of the combination of snippets taken from segments of the original voice message and the responses to these segments is sent to the original caller as indicated at 123 in FIG. 1. As the position of each pause in the incoming voice mail message is detected, the pause location is saved in a linked list as illustrated in FIG. 9. Similarly, as responses to individual segments are recorded, the location of these responses and the corresponding location of the segment responded to is saved as shown in FIG. 8. A reply message consisting of the snippets taken from each segment responded to and the recorded response is then assembled and transmitted to the original caller as shown in FIG. 9.

Segmentation

In accordance with the invention, the voice message recorded by a caller is divided into segments delimited by detected pauses. A pause may be a detected short duration of "silence" or may be a detected long single syllable (e.g. "aaah" or "errr").

In a first version of the system, "silent pauses" are found by comparing the average magnitude of non-overlapping 200 millisecond windows with a silence threshold. This threshold is initialized to be the average magnitude of the first 200 ms of the recording, which is assumed to be silence. If the average magnitude in any subsequent 200 ms window is less than the silence threshold, the silence threshold is reset to that value. The system normalizes the amplitude of the recording such that the full 8-bit linear scale is utilized (0-255). If the average magnitude of any window is within 12% of the silence threshold, it is considered to be silence.

Figure 2:
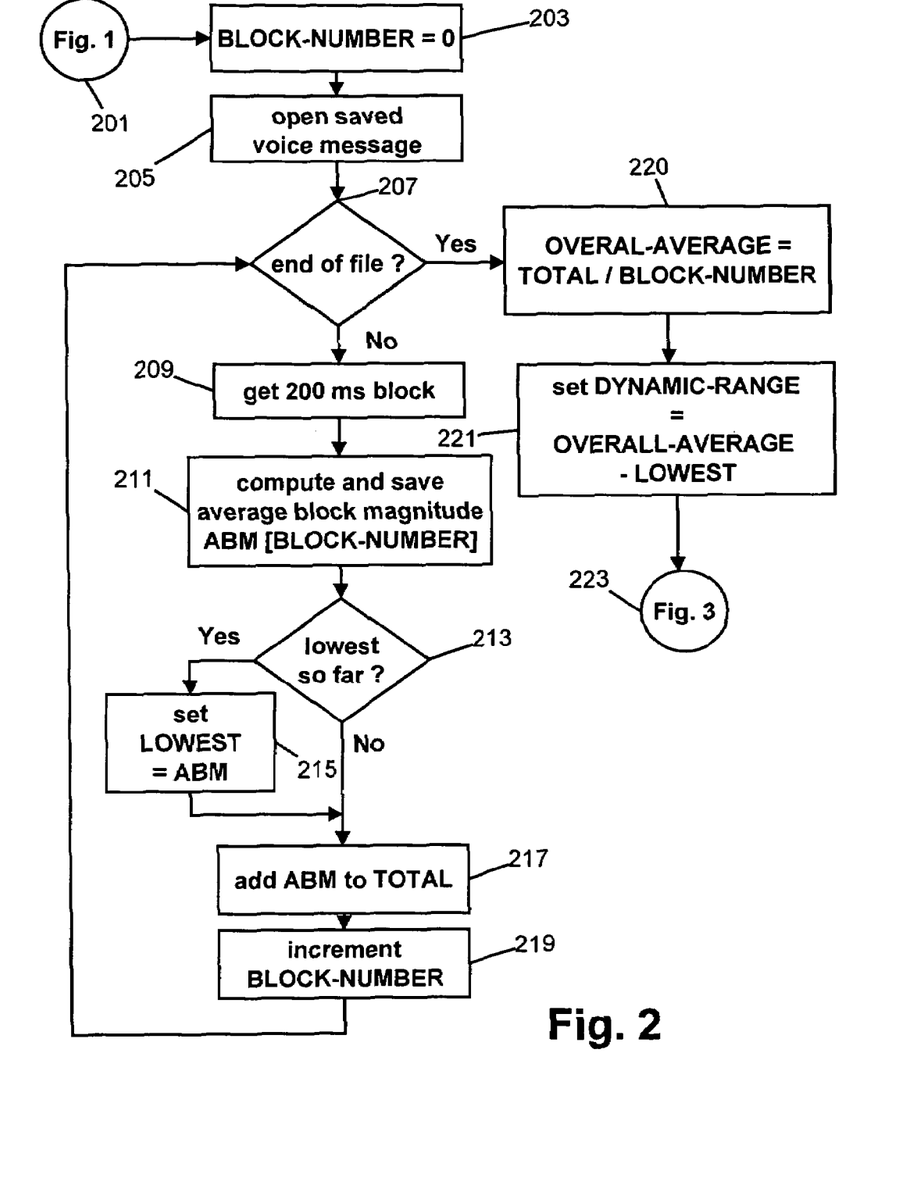
FIG. 2 is a flow chart illustrating the manner is which the voice message signal is processed to initialize certain values used in further processing.
Figure 3:
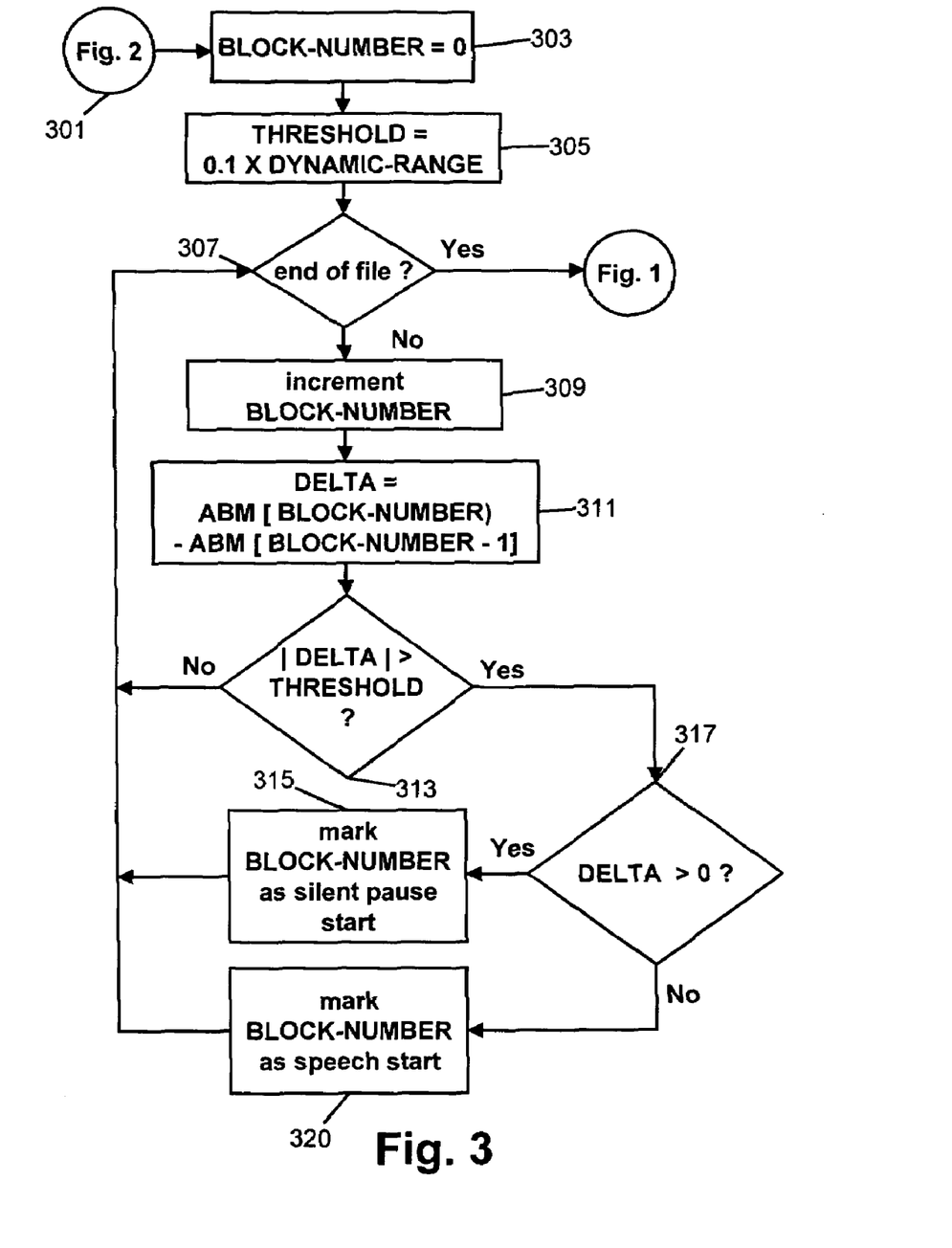
FIG. 3 is a flow chart illustrating one method of detecting silent pauses in the recorded voice message.

An improved mechanism for identifying silent periods which delimit message segments is shown in FIGS. 2 and 3. This version is modified from the simpler version described above to improve performance in the presence of noise and variable recording levels.

The voice message recording (saved at 113 in FIG. 1) is first calibrated to the dynamic range of the sound. The voice recording is processed in 200 ms blocks, each of which is identified by a BLOCK-NUMBER value initialized to zero at the start of the file as indicated at 203. Each 200 ms block is processed until the end of the file is reached as seen at 207. The average magnitude of each block is computed and saved in an array named ABM indexed by BLOCK-NUMBER as seen at 211. As seen at 213-215, Each average magnitude is compared with the previous stored LOWEST value, and if found to be even lower than the LOWEST value, replaces the LOWEST value so that, at the end of the processing, the LOWEST value is available for use as the "silence threshold." Each computed block average is added to TOTAL at 217. After averages for all of the 200 ms blocks have been processed and saved, the TOTAL value is divided by the final BLOCK-NUMBER to yield the OVERALL-AVERAGE as indicated at 220. The difference between the OVERALL-AVERAGE and the LOWEST value is saved as the DYNAMIC-RANGE value at 221.

The OVERALL-AVERAGE value for the entire recording provides a measure of the loudness of the speech recorded.

The DYNAMIC-RANGE value is the difference between the overall average and the silence threshold and provides a rough approximation of the dynamic range that is approximately correct since the recorded voice message is mostly speech with relatively few pauses.

Next, as shown in FIG. 3, the system compares the average magnitudes of adjacent 200 ms non-overlapping windows to identify the beginning and end of silent pauses. A THRESHOLD value equal to 10% of the DYNAMIC-RANGE value is saved at 305. The average values saved in the array ABM are processed by first computing the difference DELTA between two successive block averages at 311 and, if the absolute value of this difference is greater than the THRESHOLD value as determined at 313, the second block is marked at 315 as the beginning of a silent pause (if the block average was decreasing) and marked as a resumption of speech at 320 if the block average was increasing as determined at 317.

Figure 7:
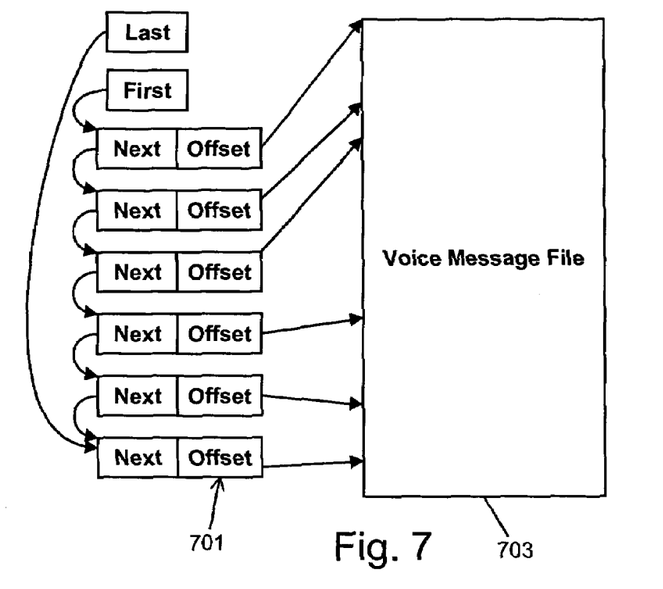
FIG. 7 is a diagram showing the manner in which the positions at which segments begin and end are delimited by a linked list of pause locations.

The location of the beginning of each segment delimited by a detected "silent pause" is posted into a linked list of nodes as indicated at 701 in FIG. 7. Each node in the linked list 701 contains a pointer NEXT to the next node in the list, and an OFFSET value indicating the starting position of a segment in the voice message file 703. The use of a linked list allows the position of "filled pauses" (which are detected as described below) to be posted into the same list which is maintained in order by OFFSET value.

Figure 4:
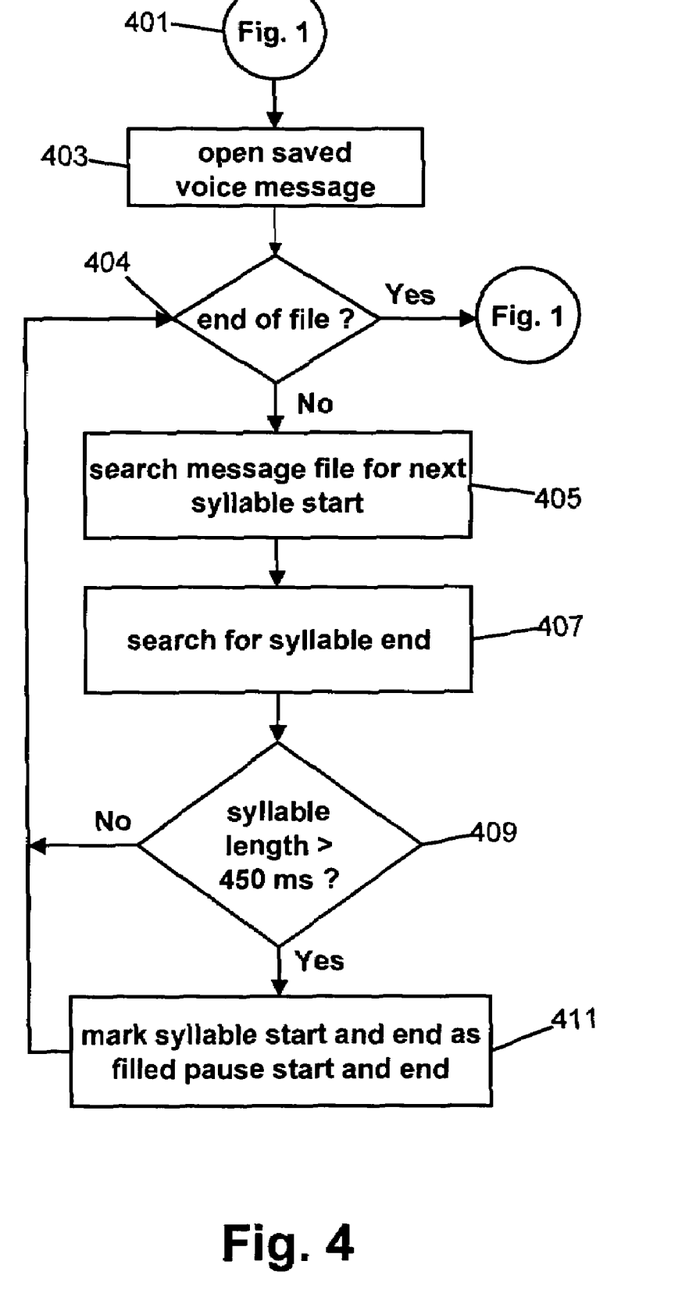
FIG. 4 is a flow chart illustrating one method of detecting filled pauses in the recorded voice message.

The system next identifies filled pauses (e.g. "umm" and "er") which take the form of long single syllables. The system marks any syllable longer than 450 ms as a filled pause. Filled pauses may be shorter, but selecting only longer single syllables provides better segmenting of the voice message. Long syllable detection employs an algorithm similar to that described by P. Mermelstein in the paper "Automatic Segmentation of Speech into Syllabic Units," Journal of the Acoustical Society of America, vol. 58, no. 4, October 1975, pp. 880-883. Energy is computed over 10 ms non-overlapping windows. The system searches the message for syllable start as indicated at 405 which are deemed to occur when the rise in energy level between successive 10 ms windows exceeds a threshold. Since messages have previously been normalized for energy, this threshold can be absolute. As seen at 407, the system then identifies the end of the syllable. A syllable ends for one of two reasons. In the simple case, the syllable is terminated by a consonant with significant vocal tract closure, and the energy drops below the same threshold. If closure is incomplete, there is still a drop in energy between vowels, for example in "do you?". If energy drops to half the peak energy in the preceding portion of the syllable and then rises to twice the minimum after that peak, a new syllable is declared at that intermediate minimum. Finally, having identified the start and end of each single syllable at 405-407, the system determines whether or not the length of the syllable exceeds 450 ms at 409. If so, the detected long single syllable is marked as a filled pause as seen at 411.

When each "filled pause" is detected, the position of the following segment is posted into the linked list seen at 701 in FIG. 1 which already holds the positions of the segments beginning with silent pauses as described above. Thus, when the process of searching for filled pauses is completed, the linked list 701 holds the starting position of each segment in the voice message file 703 that is preceded by either a silent pause or a filed pause.

By detecting silent and filled pauses, the recorded message is subdivided into salient, related "chunks", much akin to text paragraphs. Pauses and filled pauses are useful in that they often reflect thought processing on the part of the talker, and hence reflect shifts of topic or focus. The time position of both silent and filled in a linked list of nodes, each of which specifies an OFFSET value (as a byte location of a time displacement) from the beginning of the voice message file 703. As noted below, this list of pause positions may then be used to control the playback of the voice mail message to a listener (FIG. 5) and the assembly of a reply message (FIGS. 6 and 9).

Responding to Messages

Figure 5:
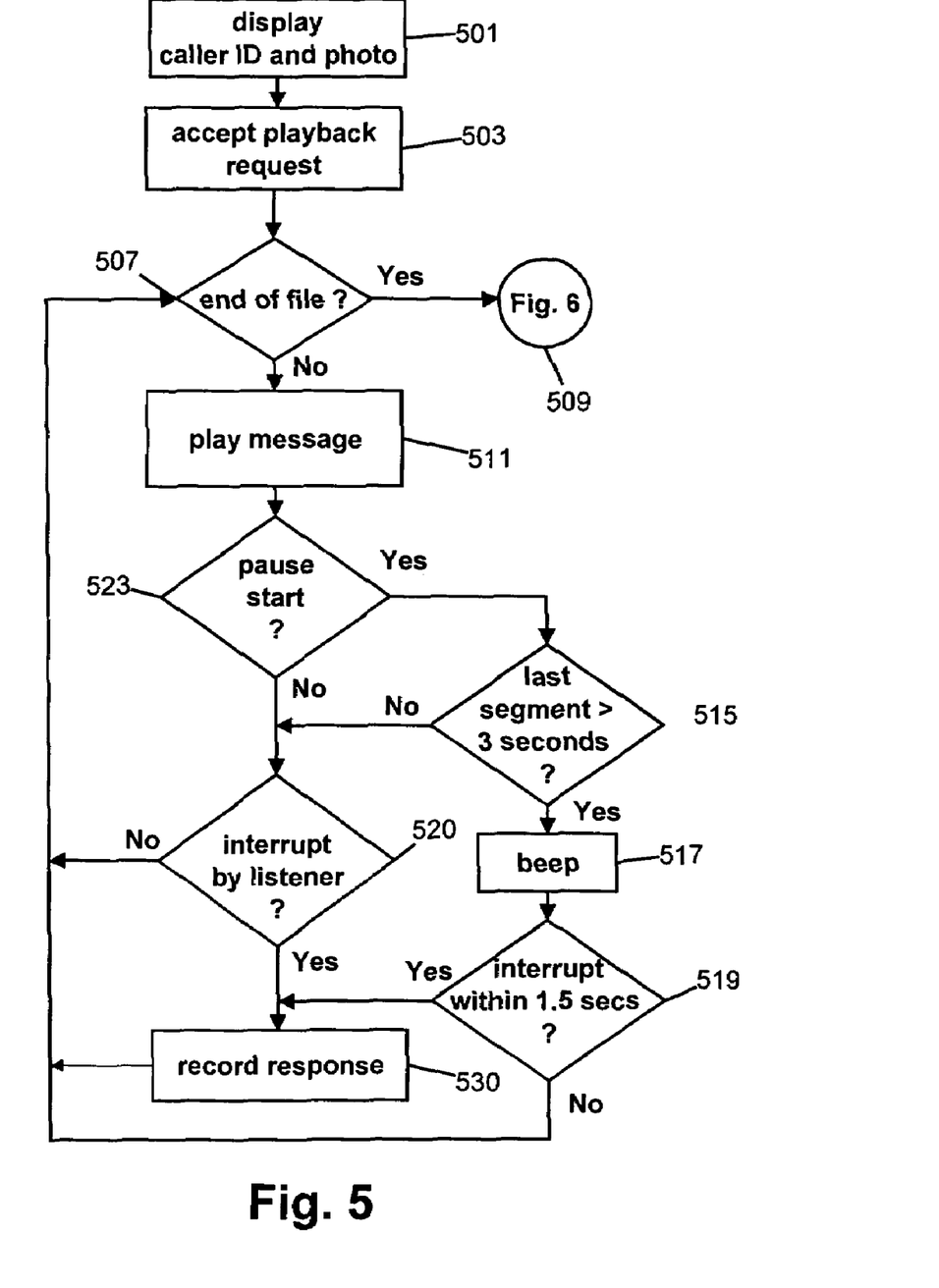
FIG. 5 is a flow chart illustrating one method of playing back the parsed voice message and accepting recorded responses from the listener.
Figure 6:
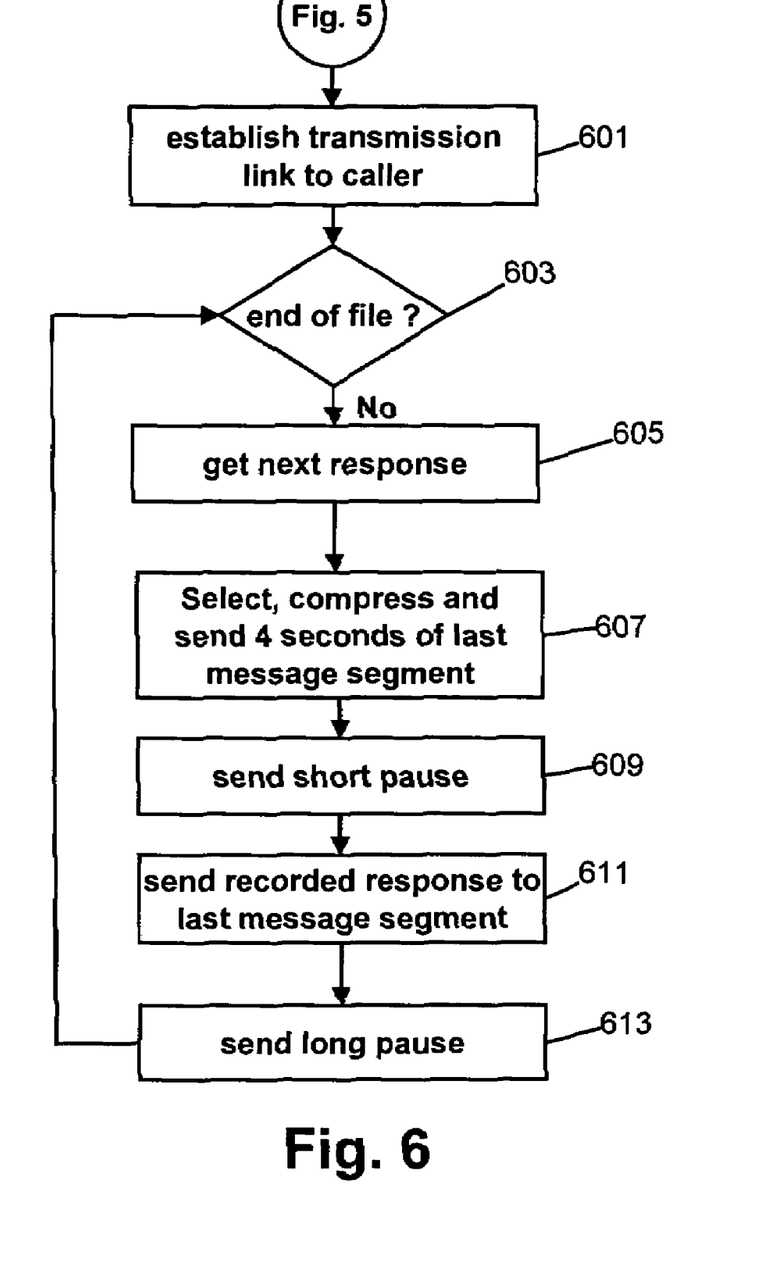
FIG. 6 is a flow chart illustrating the assembly of a reply message consisting of the combination of snippets of segments of the original voice message and the recorded responses to those segments.

When the called party is available to review previously recorded voice mail messages, an audible or visible listing of the recorded messages is presented as indicated at 501 in FIG. 5. The called party may be made aware of the existence of voice mail messages in a variety of ways: in a central-office voice mail system, the called party may hear a stutter tone when the phone is taken off-hook, and in a mobile phone system, the called party may be presented with displayed text or a hear a sound, or both, indicating the presence of messages. The system then accepts a playback request identifying a selected message to be played at 503. The selected message is then played as seen at 511 until a previously detected silent or filled pause is detected as indicated by the test at 523. If the detected pause occurred less than 3 seconds after the preceding pause as indicated by the test at 515, it is ignored. Pauses which follow other pauses by less than 3 seconds may be purged from (or not placed in) the pause list prior to playback. Note that the process of discarding or ignoring pauses which follow other pauses by less than three seconds may be performed when each new silent or filled pause position is being posted into the list 701, the linked list nodes may be processed after all pauses positions have been posted to remove the nodes identifying closely spaced pauses, or the closely spaced pauses may be ignored during playback (FIG. 5) and during the assembly of the reply message (FIGS. 6 and 9).

When a saved pause position indicates the end of a message segment, the system pauses the playback momentarily and issues an audible cue (e.g., the "beep" seen at 517) to invite the listener to record a response. If the listener speaks into the microphone within 1.5 seconds, the dictated response is recorded as indicated at 530; otherwise, playback is continued until the next segment end or an affirmative interruption request issued by the listener as indicated at 520.

The listener may interrupt the playback of a message and record a response at any time. The interruption may be triggered by the listener speaking into the microphone or telephone handset or by manually actuating an interrupt control (such as a pushbutton on the telephone handset, or any other conveniently located switch control).

When the system is recording a response, a visual indicator such as a LED may be energized to visually inform the listener that the system is recording. This visual indicator thus also indicates when the recording is terminated by a pause during "hands free" operation. The combination of audible cues (beeps) and the visual indicator should unambiguously indicate the record/playback status of the system at all times.

The manually operated control may also be used to end the recording of the response at 530. Some users (e.g. cellular phone users) may prefer "hands free" operation in which playback resumes automatically with the next message segment after any pause in the dictation of, say, 1.5 seconds. Others may wish to affirmatively indicate when the playback is to resume, and may also wish to pause the recording of a response momentarily to allow time to mentally compose a suitable response. A menu of options may be presented to the user to permit the selection of any such preferred mode of operation.

Note that the listener does not need to respond to every segment; if the listener chooses not to speak, the system detects the silence and plays the next section. This continues until the entire message has been played. The interface is purposefully simple, allowing hands free voice control, or a simple touch control, or a combination of the two to begin, pause or end playback of messages and the recording of responses.

Each response message may be recorded into a voice message recording file as illustrated at 801 in FIG. 8, and the beginning of each recorded response saved in a node of a linked list 803 in a field named "Response Offset." The same node records the offset value from the linked list 701 that identifies the starting location of the voice message segment being responded to.

Using the linked lists 701 and 803, the listener need not record all responses during the first playback of the recorded voice mail message. The voice message file 703 may be replayed, interrupted at a different point, and an additional response may be recorded. The further response is recorded at the end of the file of responses 801 and identified by a node that is posted into the linked list 803 based on the position of the segment being responded to. The listener may pause, rewind and write over a recorded response as it is being dictated. In addition, the listener may review the reply message (described below) before it is sent to add, delete or modify any portion of it before it's sent.

The Reply

A reply message comprising the combination of each response recorded by the listener and a short "snippet" extracted from the voice message segment being responded to. The manner in which the reply message is generated is shown in the flowchart of FIG. 6 and the structure of the resulting reply message is shown in FIG. 9.

The linked list seen at 803 in FIG. 8 is scanned to identify each recorded response as well as the node in the linked list 701 that specifies the location of the segment in the original voice mail message being responded to. A short snippet of the segment being responded to is extracted from the voice message file, time-compressed, and combined with the recorded response to form a snippet/response unit of the reply message as illustrated in FIG. 9.

As seen in FIG. 6, a communication link for transmitting the reply message of FIG. 9 is first established at 601. The reply message is typically transmitted by establishing a dial up telephone connection to the original calling party using the caller ID information recorded when the call was placed, or the reply message may be stored in a common mail system with no delivery being required. Alternatively, an email address of the caller may be obtained from the local caller-ID database (which may also store a photograph or other image depicting the caller displayed during message selection and response recording as noted above). Using this email address, the reply message may be sent as an audio file attachment (e.g. a recorded MP3 file) to an email message sent to the calling party. Alternatively, the caller may be advised at the time the original voice mail message is recorded that a response will be made available at a designated World Wide Web URL which the caller may access later when the response is available.

The reply message seen in FIG. 9 is assembled as shown in FIG. 6. The linked list seen at 803 in FIG. 8 is scanned to locate the next recorded response as shown at 605. The Offset value in the linked list 803 is used to find the corresponding Offset value in the linked list 707 which identifies the beginning and ending of the segment of the voice mail message being responded to. A brief portion of this segment (e.g. four seconds) is extracted and time compressed as seen at 607. A short pause (interval of silence) is then inserted into the reply message following this time compressed snippet as seen at 609. The recorded response from the response file is then appended to the reply message at 611, followed by a longer pause as indicated at 613, and the process is repeated until no more responses are left to process.

Note that, when the caller and the called party both use compatible voice messaging equipment, the reply message may be automatically returned to the caller's voice messaging system (via a dial-up telephone connection or via an Internet file transfer) where it is recorded for playback by the original caller when convenient. When compatible systems are available to both parties, the original voice message may composed on the caller's system and may be affirmatively subdivided into segments by system-inserted pauses or other delimiters to invite separate responses from the called party. In this case, the original caller retains a recorded copy of the original voice mail message, and the response file may be take the form of units consisting of a recorded response and a pointer (offset value) indicating the location of the segment being responded to in the original voice mail message retained by the caller. As noted earlier, when the parties are using the same voice mail system, physical delivery of the reply message is not necessary since the original calling party may retrieve it from common storage.

The snippets and responses in the reply message are preferably separated by silent pauses, with a longer pause being inserted after the response. In this way, when both the caller and called party are using compatible messaging systems, the reply message may be treated as an incoming voice mail message, and the pauses in the reply message may be used to detect sections of the reply to be responded to, thereby continuing the dialogue between the parties.

In order to provide context to the individual responses, the original caller is preferably presented with a short compressed snippet of each segment being responded to before the called party's response is played. These snippets can take the form a small portion of the original message, say four seconds, that may be further time-compressed by half, and then played in condensed form before the recorded response. Time compression may be performed using the SOLA algorithm described by Wayman, J. L., Reinke R. E. Wilson and D. L. in the paper "High Quality Speech Expansion, Compression, and Noise Filtering Using the SOLA Method of Time Scale Modification," 23rd Asilomar Conference on Signals, Systems, and Computers, vol. 2, Oct. 1989, pp. 714-717. Thus, the transmission of snippets of the original message serves the same need as the reproduction in an email message of all or part of an email message being responded to.

Personal Preferences

Experience with prototype systems revealed that different users may prefer that the system perform differently, either as a matter of personal taste or because the applications in which the voice messaging system is used differ. As a result, a number of different operating parameters may be varied to better meet the needs or expectations of individual users.

As noted above, some users may prefer hands-free operation and others may prefer to manually control when a voice mail message is to be interrupted to record a response, and/or when a response being recorded is deemed to be concluded.

The algorithm for detecting silent pauses (described in connection with FIG. 3) may be varied at the option of the listener to detect fewer or more pauses. The time duration separating closely spaced pauses (e.g. three seconds as described above) may be reduced or enlarged to better match the preferences of the listener.

The duration of the "snippets" extracted from the segment being responded to may be increased or decreased from the four second nominal duration given above. Some users may prefer that longer snippets be sent to provide more context for the response, while others may prefer that shorter snippets (or no snippets at all) be sent. Similarly, the degree to which the snippets are compressed may be varied. Time compression of the snippets reduces their length while preserving their content, but some users may find the "chipmunk" quality of the time compressed speech to be distracting.

Use of Pictures

The user interface for the voice messaging system contemplated by the present invention may be take the form of a single touch-screen display panel designed to be aesthetically pleasing and to be placed on a coffee table or public space. By placing the device in a highly visible location, the process of checking for messages may be made more transparent. When new messages arrive, a picture of the caller is displayed on the device indicating that there is a new message. If no picture of the caller is available, a default image or caller ID information may be displayed. If there are no new messages, a default picture that the user selects beforehand is displayed. This visual interface gives the listener the feeling of being in a conversation. By displaying a picture of the calling party, the user feels as if they were talking to someone. Allowing the user to control the pictures that are displayed by default and for each caller also allows a large amount of personalization of the device.

Although stand-alone answering machines remain a staple of consumer electronics, they may become obsolete in a world of voicemail where everyone carries a personal mobile phone. But mobile users can gain special benefit from the alternating play and record cycles of the present invention, due to cognitive load and difficulty taking notes while mobile. The latest phones now include color screens which could display a photograph of the caller. Recent emergence of camera-equipped phones enables the easy exchange of images and could support the creation and transmission of voice-annotated slide shows on the telephone.

The present invention may be implemented as either a telephone or internet appliance, It records ordinary phone messages, can be accessed by phone, and can deliver replies back over the telephone network as analog audio. But messages can also be returned as MIME attachments and the system may be implemented in a device having an IP address, permitting it to receive incoming messages and return reply messages with voice responses via the Internet.

CONCLUSION

It is to be understood that the methods and apparatus which have been described above are merely illustrative applications of the principles of the invention. Numerous modifications may be made by those skilled in the art without departing from the true spirit and scope of the invention.

What is claimed is:

1. A method for exchanging voice messages between a calling party and a called party comprising, in combination, the steps of:
receiving and recording an incoming voice message from said calling a party as a speech signal recording,
analyzing the voice signal content of said speech signal recording to identify boundaries subdividing said speech signal recording into segments,
reproducing said speech signal recording to said called party while pausing between at least some said segments to accept and record a spoken response from said called party as a recorded speech signal response, and
transmitting a reply message including each such recorded speech signal response to said calling party.

2. A method for exchanging voice messages as set forth in claim 1 wherein said step of analyzing the voice signal content of said speech signal recording comprises the step of detecting segment-delimiting pauses in said voice signal content.

3. A method for exchanging voice messages as set forth in claim 2 wherein said step of detecting segment-delimiting pauses includes the step of detecting the presence of intervals in said voice signal content having a low average magnitude.

4. A method for exchanging voice messages as set forth in claim 3 wherein said intervals of low average magnitude are preceded by an abrupt reduction in the average magnitude of said voice signal content and followed by an abrupt increase in the average magnitude of said voice signal content.

5. A method for exchanging voice messages as set forth in claim 3 wherein said step of detecting segment delimiting pauses includes the step of detecting the presence of single syllables in said voice signal content having a duration which exceeds a predetermined threshold duration.

6. A method for exchanging voice messages as set forth in claim 3 wherein said step of detecting the presence of intervals in said voice signal content having a low average magnitude comprises detecting intervals in said voice signal content having an average magnitude less than a predetermined threshold magnitude.

7. A method for exchanging voice messages as set forth in claim 2 wherein said step of detecting segment delimiting pauses includes the step of detecting the presence of single syllables in said voice signal content having an extended duration.

8. A method for exchanging voice messages as set forth in claim 2 wherein said step of detecting segment delimiting pauses includes the step of detecting the presence of intervals in said voice signal content having a low average magnitude and the presence of single syllables of extended duration in said voice signal content.

9. A method for exchanging voice messages as set forth in claim 1 further comprising the step performed at any time during the reproduction of said speech signal recording of accepting an interrupt command from said called party and thereafter recording said spoken response from said called party as a recorded speech signal response.

10. A method for exchanging voice messages as set forth in claim 9 wherein said step of detecting segment-delimiting pauses includes the step of detecting the presence of intervals in said voice signal content having a low average magnitude.

11. A method for exchanging voice messages as set forth in claim 9 wherein said step of detecting segment-delimiting pauses includes the step of detecting the presence of intervals in said voice signal content having a low average magnitude and the presence of single syllables of extended duration in said voice signal content.

12. A method for exchanging voice messages as set forth in claim 9 wherein said reply message comprises the combination of each such response and at least a portion of that segment of said speech signal recording reproduced immediately before the recording of each such spoken response.

13. A method for exchanging voice messages as set forth in claim 1 wherein said reply message comprises the combination of each such recorded speech signal response and at least a portion of that segment of said speech signal recording reproduced immediately before the recording of each such recorded speech signal response.

14. A method for exchanging voice messages as set forth in claim 13 wherein said portion of that segment of said speech signal recording reproduced immediately before the recording of each such recorded speech signal response has a predetermined maximum duration.

15. A method for exchanging voice messages as set forth in claim 14 wherein said portion of that segment of said speech signal recording reproduced immediately before the recording of each such recorded speech signal response is time compressed to reduce its duration while preserving its information content.

16. A method for exchanging voice messages as set forth in claim 13 wherein said reply message further includes pauses following each such recorded speech signal response.

17. A method for exchanging voice messages as set forth in claim 13 further comprising the step performed during the reproduction of said speech signal recording of accepting an interrupt command followed by recording a recorded speech signal response from said called party.

18. A method for exchanging voice messages as set forth in claim 1 wherein said step of transmitting a reply message to said calling party comprises establishing a telephone connection to said calling party and transmitting said reply message via said telephone connection.

19. A method for exchanging voice messages as set forth in claim 1 wherein said step of transmitting a reply message to said calling party comprises establishing an Internet connection to said calling party and transmitting said reply message via said Internet connection.

20. A method for exchanging voice messages as set forth in claim 1 wherein said step of transmitting a reply message to said calling party comprises transmitting said reply message as a part of an email message to said calling party.

\* \* \* \* \*